UNITED STATES PATENT OFFICE.

F. MARQUARD, OF RAHWAY, NEW JERSEY.

IMPROVEMENT IN THE MANUFACTURE OF WHITE RUBBER.

Specification forming part of Letters Patent No. 51,331, dated December 5, 1865.

*To all whom it may concern:*

Be it known that I, F. MARQUARD, of Rahway, in the county of Union and State of New Jersey, have invented new and useful Improvements in Preparing White Rubber, &c.; and I do hereby declare that the following is a full, clear, and exact description thereof, which will enable those skilled in the art to make and use the same.

This invention consists in dissolving india-rubber or allied gums in chloroform or any other of the well-known solvents and treating the solution with strong caustic ammonia-gas. This solution is then washed with water, and at the same time distilled so as to recover the solvent.

In order to produce hard rubber or other gum, the white gum obtained by the above process is again dissolved and mixed with phosphate of lime in such quantities as may be desired.

It will be noticed that this process resembles in many respects that which is described in a patent granted to Engelhard and Havemann, November 22, 1859, as follows: "Solid lumps of india-rubber or gutta-percha are dissolved in one of the well-known solvents of such gums, and this solution is brought in contact with chlorine by passing a stream of gaseous chlorine into the same, in order to bring the chlorine in intimate contact with the gum contained in said solution. When the combination of the gum with the chlorine is perfected the solvent is removed by evaporation at a low temperature or by filtering, and then the composition is well washed with alcohol and pressed and dried."

My process differs from the above in that I use caustic ammonia-gas where they use chlorine.

The advantages derived from making this change are manifold.

First, my process is cheaper than that of treating the gum with chlorine gas.

Secondly, the use of chlorine is objectionable on account of its odor and because it is highly injurious to the operators.

Thirdly, the chlorine is liable to destroy the tenacity and elasticity of the gum, which is not the case with the ammonia-gas.

The product obtained by my process is tough and tenacious, and when further treated with phosphate of lime an article is produced closely resembling ivory in all its qualities.

In this process I prefer the use of phosphate of lime to that of pure lime, which has heretofore been used, for the following reasons:

First, phosphate of lime—viz., phosphorus and lime—being the principal compound of bone, (and, of course, of ivory also,) it will, for this reason alone, be a better assistant in forming a substitute for bone or ivory, and will give a better mass.

Secondly, the phosphate of lime can be obtained of greater purity than the oxide of calcium, and the color of the former more closely resembles that of bone or ivory.

Thirdly, the pure lime, having more or less caustic reaction, will tend to testing the fibers of the gum, which should impart to the whole compound strength and tenacity.

Having thus described my invention, what I claim as new, and desire to secure by Letters Patent, is—

1. The product obtained by the action of ammonia-gas on gums, such as india-rubber or gutta-percha, when said gums are treated according to the process herein described or according to any equivalent process which will produce a like result.

2. Mixing the product obtained by the above process with phosphate, and substantially as and for the purpose set forth.

The above specification of my invention signed by me this 12th day of October, 1865.

F. MARQUARD.

Witnesses:
ALBERT W. BROWN,
WM. E. LYON.